A. W. PORTER.
COTTON SWEEP.
APPLICATION FILED JUNE 9, 1911.
1,001,164.
Patented Aug. 22, 1911.
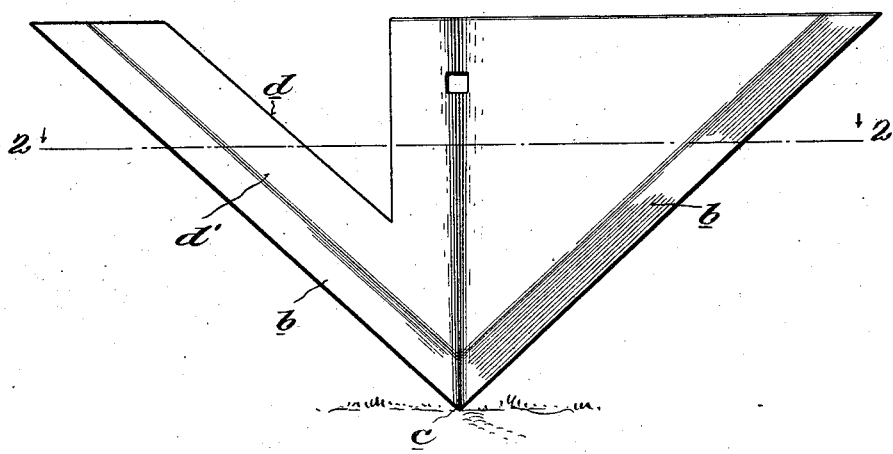
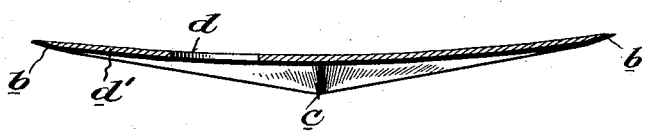
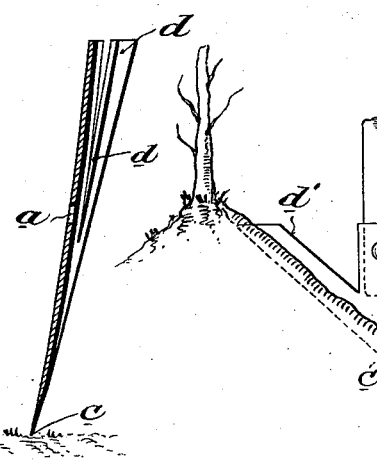
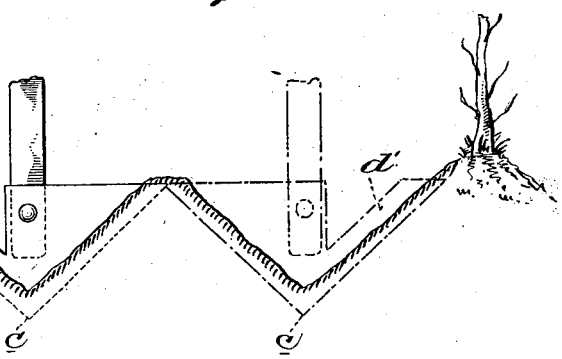
Witnesses
Inventor
A. W. Porter
By Davis & Davis
Attorneys

UNITED STATES PATENT OFFICE.

ARTHUR W. PORTER, OF ROCKINGHAM, NORTH CAROLINA.

COTTON-SWEEP.

1,001,164. Specification of Letters Patent. Patented Aug. 22, 1911.

Application filed June 9, 1911. Serial No. 632,255.

*To all whom it may concern:*

Be it known that I, ARTHUR W. PORTER, a citizen of the United States, and a resident of Rockingham, county of Richmond, State of North Carolina, have invented certain new and useful Improvements in Cotton-Sweeps, of which the following is a full and clear specification, reference being had to the accompanying drawings, in which—

Figure 1 is a front elevation of my improved sweep; Fig. 2 is a vertical sectional view taken through the middle; Fig. 3 a view looking at the upper edge of the sweep; and Fig. 4 a diagram showing the manner of using this sweep.

In most sections of the cotton belt of the southern States cotton is planted by throwing two furrows together to form a ridge and planting the cotton in the ridge, there being left between the rows a ridge-like area of soil. If this intermediate ridge-like portion is not cultivated early it becomes very grassy and weedy, and it is therefore the object of this invention to provide a plow or sweep which may be used for the first, second and third cultivation of the young cotton plants and which every time it is used will break up the intermediate ridge and cut the roots of grass and weeds therein, thus keeping this intermediate ridge free of detrimental vegetation, and at the same time keep the soil in the planted ridge well cultivated.

The invention consists of a metallic blade provided with a hole $a$ by means of which and a suitable bolt it may be attached to any suitable plow stock or foot. The two side edges $b$ of the blade are sharpened and are converged to a point $c$, which is at the vertical center of the plate, in line with the bolt hole $a$, and the top edge of the plow plate runs straight across, except that at one side of the bolt hole it is provided with a deep notch $d$, which converts one side of the plate into a comparatively narrow blade $d'$ which extends upwardly and backwardly. The blade at the other side of the center is unbroken as to surface. The blade is slightly dished transversely to give the proper curvature to the front surface of the unbroken side of the blade. The two cutting edges of the blade are in substantially the same plane.

In Fig. 4 is shown a diagram illustrating the manner of using the sweep in the cultivation of cotton. It will be seen that the winged portion $d$ of the blade is next to the row of plants and that it works along the ridge and loosens up the earth without breaking down the ridge or plowing it away. The solid side of the sweep extends out into the uncultivated ridge between the plants and breaks up the soil therein and cuts the roots of any weeds or grass that may be growing therein.

It will be understood that the earth in the plant ridge is much looser and easier to work than the soil in the intermediate ridge, so that in using the plow the wing $d'$ will always be working on the plant ridge while the other and stronger side of the blade is working in the packed and hardened soil of the intermediate ridge.

Having thus described my invention, what I claim as new and desire to secure by Letters Patent, is—

A plow sweep consisting of a substantially triangular blade having a straight top edge and side edges converging downwardly to the entering point of the plow, and having the blade at one side of the center unbroken while at the other side of the center it is notched or cut away to form a wing which is adapted to work in the soil of the plant ridge, while the solid or unbroken side of the plate is adapted to work in the ridge between the plants.

In testimony whereof I hereunto affix my signature in the presence of two witnesses.

A. W. PORTER.

Witnesses:
JNO. P. CAMERON,
JNO. N. HASTY.